United States Patent
Lee et al.

(10) Patent No.: US 10,815,358 B2
(45) Date of Patent: *Oct. 27, 2020

(54) REINFORCING MATERIAL FOR RUBBER COMPRISING ALUMINOSILICATE PARTICLES AND RUBBER COMPOSITION FOR TIRES COMPRISING THE SAME

(71) Applicant: LG Chem, Ltd., Seoul (KR)

(72) Inventors: Ha Na Lee, Daejeon (KR); Shin Hee Jun, Daejeon (KR); Kwon Il Choi, Daejeon (KR); Woo Seok Kim, Daejeon (KR); Myounghwan Oh, Daejon (KR); Han Nah Jeong, Daejon (KR)

(73) Assignee: LG Chem, Ltd. (KR)

( * ) Notice: Subject to any disclaimer, the term of this patent is extended or adjusted under 35 U.S.C. 154(b) by 197 days.

This patent is subject to a terminal disclaimer.

(21) Appl. No.: 16/070,633

(22) PCT Filed: Sep. 4, 2017

(86) PCT No.: PCT/KR2017/009656
§ 371 (c)(1),
(2) Date: Jul. 17, 2018

(87) PCT Pub. No.: WO2018/048157
PCT Pub. Date: Mar. 15, 2018

(65) Prior Publication Data
US 2020/0148854 A1  May 14, 2020

(30) Foreign Application Priority Data

Sep. 9, 2016 (KR) .................. 10-2016-0116738
Sep. 1, 2017 (KR) .................. 10-2017-0112075

(51) Int. Cl.
*C08K 3/34* (2006.01)
*B60C 1/00* (2006.01)
(Continued)

(52) U.S. Cl.
CPC .................. *C08K 3/34* (2013.01); *B60C 1/00* (2013.01); *C01B 33/26* (2013.01); *C08L 9/06* (2013.01);
(Continued)

(58) Field of Classification Search
CPC ................ C08K 3/34; C08K 2003/343; C08K 2201/011; C08K 2201/005; B60C 1/00;
(Continued)

(56) References Cited

U.S. PATENT DOCUMENTS 4,929,431 A * 5/1990 Hagiwara ............... C09C 1/405
423/328.1
4,987,162 A   1/1991 Wason
(Continued)

FOREIGN PATENT DOCUMENTS

CN   1100438 A   3/1995
CN   1054354 C   7/2000
(Continued)

OTHER PUBLICATIONS

International Search Report for Application No. PCT/KR2017/009656 dated Dec. 7, 2017.
(Continued)

*Primary Examiner* — Robert D Harlan
(74) *Attorney, Agent, or Firm* — Lerner, David, Littenberg, Krumholz & Mentlik, LLP

(57) ABSTRACT

The present disclosure relates to a reinforcing material for rubber including aluminosilicate particles, and a rubber composition for tires including the same. The reinforcing material for rubber according to the present disclosure
(Continued)

exhibits excellent dispersibility in the rubber composition and reinforcing effect, and thus can be suitably used for eco-friendly tires requiring high efficiency and high fuel efficiency characteristics.

5 Claims, 4 Drawing Sheets

(51) Int. Cl.
*C01B 33/26* (2006.01)
*C08L 9/06* (2006.01)

(52) U.S. Cl.
CPC ...... *C01P 2002/72* (2013.01); *C01P 2002/82* (2013.01); *C01P 2004/03* (2013.01); *C01P 2004/64* (2013.01); *C01P 2006/12* (2013.01); *C01P 2006/16* (2013.01); *C08K 2003/343* (2013.01); *C08K 2201/005* (2013.01); *C08K 2201/006* (2013.01); *C08K 2201/011* (2013.01)

(58) Field of Classification Search
CPC ........ C01B 33/26; C08L 9/06; C01P 2002/72; C01P 2004/64; C01P 2006/16; C01P 2004/03; C01P 2002/82; C01P 2006/12
See application file for complete search history.

(56) References Cited

U.S. PATENT DOCUMENTS

| | | | |
|---|---|---|---|
| 5,919,427 | A | 7/1999 | Harada et al. |
| 6,096,820 | A | 8/2000 | Lockledge et al. |
| 6,200,919 | B1 | 3/2001 | Singh et al. |
| 7,256,233 | B2 | 8/2007 | Simonot et al. |
| 9,238,219 | B2 | 1/2016 | Kubota et al. |
| 9,895,683 | B2 | 2/2018 | Kubota et al. |
| 2006/0009564 | A1 | 1/2006 | Simonot et al. |
| 2006/0052274 | A1 | 3/2006 | Stebbing et al. |
| 2006/0269472 | A1 | 11/2006 | Mackinnon et al. |
| 2008/0006377 | A1 | 1/2008 | Stebbing et al. |
| 2009/0242847 | A1 | 10/2009 | Hosoya et al. |
| 2010/0189620 | A1 | 7/2010 | Lemon et al. |
| 2010/0221297 | A1 | 9/2010 | Arakawa et al. |
| 2011/0037023 | A1 | 2/2011 | Stebbing et al. |
| 2011/0224117 | A1 | 9/2011 | Mitsuishi et al. |
| 2013/0055924 | A1 | 3/2013 | Seo et al. |
| 2014/0342156 | A1 | 11/2014 | Seo et al. |
| 2019/0375645 | A1 | 12/2019 | Choi et al. |
| 2020/0010329 | A1* | 1/2020 | Choi ............... B60C 1/00 |
| 2020/0024430 | A1* | 1/2020 | Choi ............... B60C 1/00 |

FOREIGN PATENT DOCUMENTS

| | | | |
|---|---|---|---|
| CN | 1365375 | A | 8/2002 |
| CN | 1708621 | A | 12/2005 |
| CN | 1798700 | A | 7/2006 |
| CN | 1997592 | A | 7/2007 |
| CN | 102530978 | B | 4/2014 |
| EP | 0235431 | A2 | 9/1987 |
| EP | 0593014 | A1 | 4/1994 |
| EP | 0995775 | A1 | 4/2000 |
| EP | 1219676 | B1 | 7/2008 |
| JP | H0762142 | A | 3/1995 |
| JP | 2509214 | B2 | 6/1996 |
| JP | 2000119444 | A | 4/2000 |
| JP | 2000233919 | A | 8/2000 |
| JP | 2001072802 | A | 3/2001 |
| JP | 3700964 | B2 | 9/2005 |
| JP | 2006510766 | A | 3/2006 |
| JP | 2010090289 | A | 4/2010 |
| JP | 4633471 | B2 | 2/2011 |
| JP | 4674896 | B2 | 4/2011 |
| JP | 5474293 | B2 | 4/2014 |
| JP | 6083903 | B2 | 2/2017 |
| KR | 100388525 | B1 | 10/2003 |
| KR | 101037143 | B1 | 5/2011 |
| KR | 20170048850 | A | 5/2017 |
| KR | 20180028927 | A | 3/2018 |
| WO | 2015191817 | A1 | 12/2015 |
| WO | 2016064138 | A1 | 4/2016 |

OTHER PUBLICATIONS

International Search Report for Application No. PCT/KR2017/009657 dated Dec. 7, 2017.
Kay Saalwächter., "Microstructure and Molecular Dynamics of Elastomers as Studied by Advanced Low-Resolution Nuclear Magnetic Resonance Methods", Rubber Chemistry and Technology, Feb. 2012, vol. 85, No. 3, pp. 350-386.
Chinese Search Report for Application No. CN201780010170.X dated Dec. 3, 2019.
Extended European Search Report and Written Opinion for EP Application No. 17849041.3, dated Dec. 13, 2018.
Extended European Search Report and Written Opinion for EP Application No. 17849042.1, dated Dec. 13, 2018.

* cited by examiner

[FIG. 1a]
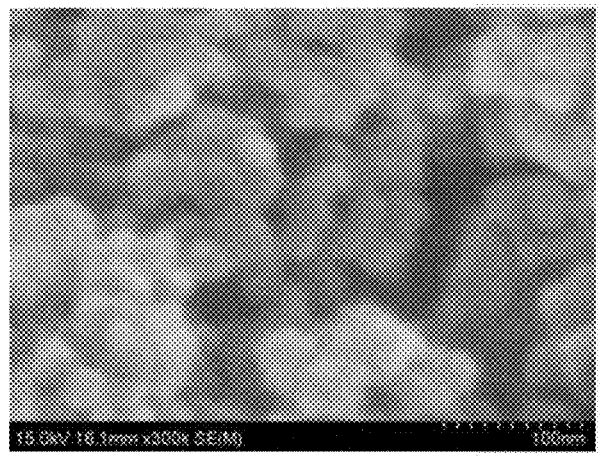
[FIG. 1b]
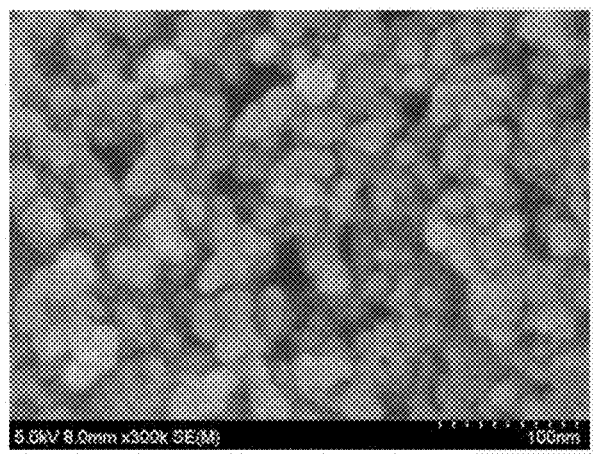
[FIG. 1c]
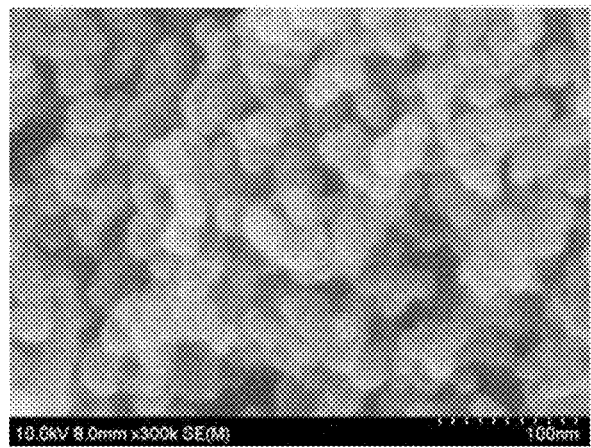

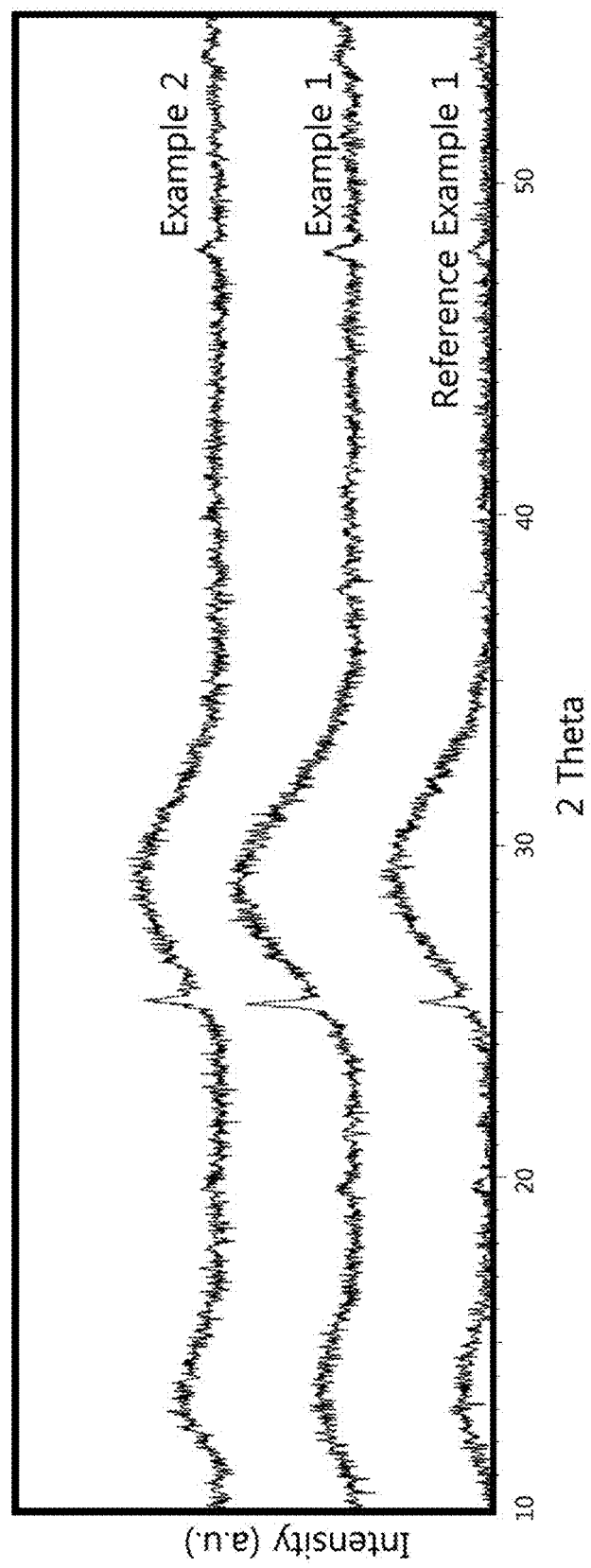
[FIG. 2]

[FIG. 3]
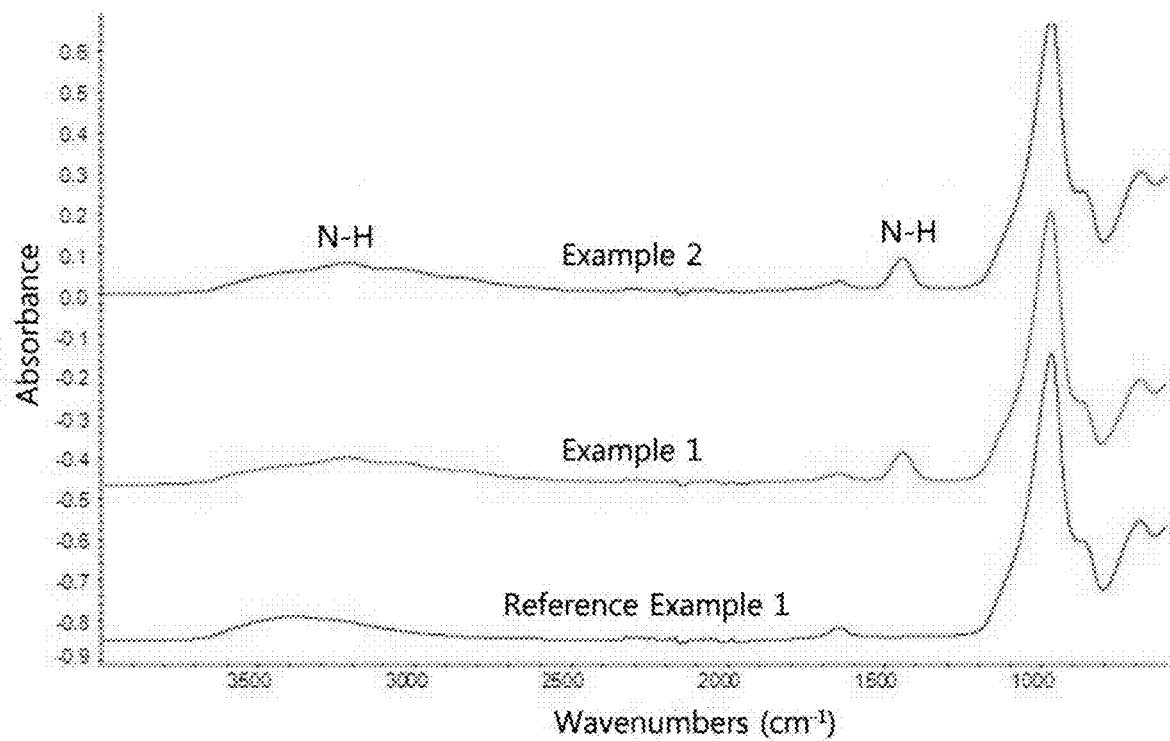

[FIG. 4]
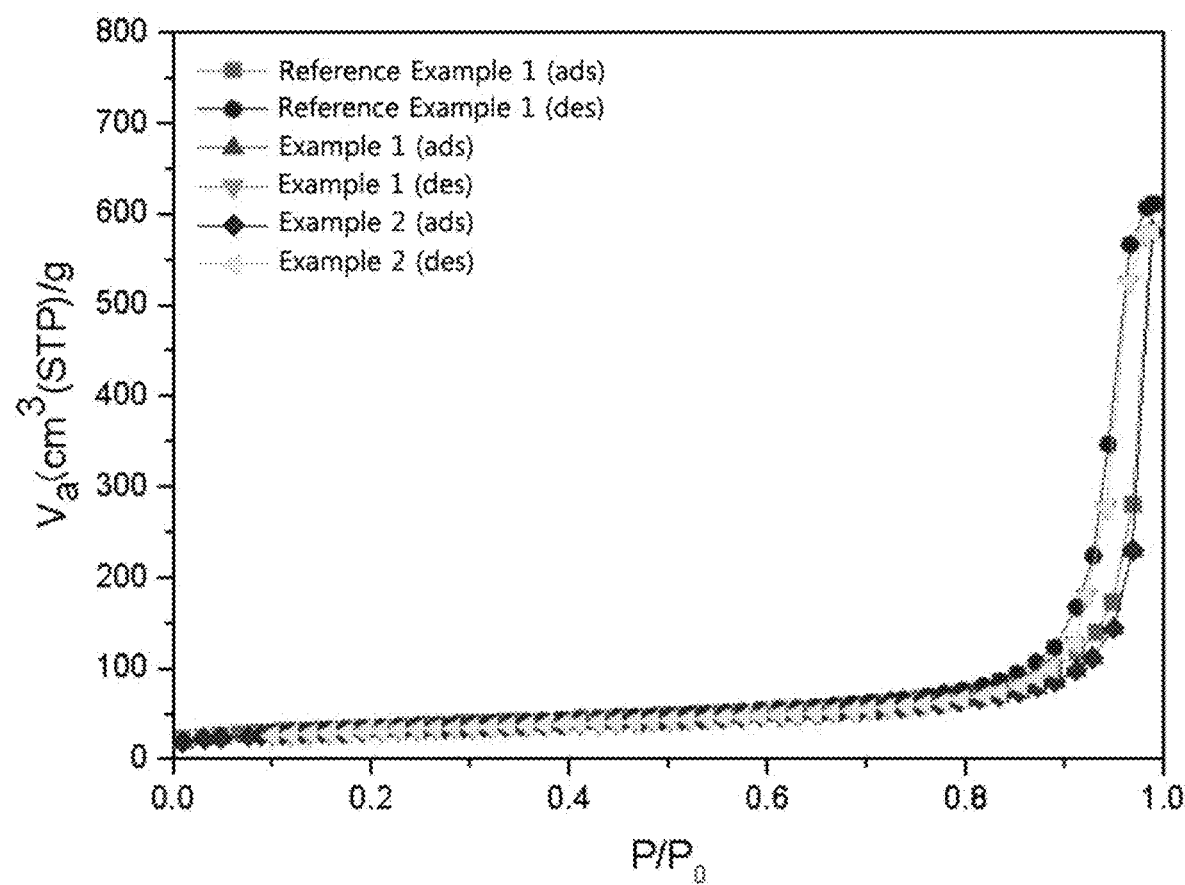

REINFORCING MATERIAL FOR RUBBER COMPRISING ALUMINOSILICATE PARTICLES AND RUBBER COMPOSITION FOR TIRES COMPRISING THE SAME

CROSS-REFERENCE TO RELATED APPLICATION

The present application is a national phase entry under 35 U.S.C. § 371 of International Application No. PCT/KR2017/009656, filed on Sep. 4, 2017, which claims the benefits of Korean Patent Application No. 10-2016-0116738 filed on Sep. 9, 2016 and No. 10-2017-0112075 filed on Sep. 1, 2017, the disclosures of which are incorporated herein by reference.

TECHNICAL FIELD

The present disclosure relates to a reinforcing material for rubber including aluminosilicate particles, and a rubber composition for tires including the same.

BACKGROUND OF ART

As concerns about global warming and environmental problems spread, environment-friendly concepts of increasing energy efficiency and reducing carbon emissions have attracted attention in various fields. These environment-friendly concepts are becoming evident in the tire industry by developing highly efficient eco-friendly tires and recycling waste tires.

Eco-friendly tires (or green tires) are tires that can reduce rolling resistance of rubber to achieve high efficiency and high fuel efficiency, resulting in a reduction in carbon emissions. Modified rubber materials and rubber reinforcing white additives (for example, precipitated silica) have been mainly used for manufacturing such eco-friendly tires.

Generally, silica materials have a problem that dispersibility in the rubber composition is low so that abrasion resistance is deteriorated. In order to compensate for this, it is known that a highly dispersed precipitated silica having specific conditions can be used together with a silane coupling agent to make a material for eco-friendly tires having good abrasion resistance.

On the other hand, there is also a high interest in additives such as the highly dispersed precipitated silica which may have good conflicting properties (mechanical strength such as rolling resistance and abrasion resistance). It is known that even when alumina, clay, kaolin, or the like is applied as the rubber reinforcing white additive, it can be used as an eco-friendly tire material by lowering rolling resistance. However, the rubber reinforcing white additive has a problem that the dispersibility decreases due to formation of a strong aggregate and the like, resulting in problems such as deterioration of mechanical strength.

PRIOR ART DOCUMENTS

Non-Patent Documents (Non-Patent Document 1) Kay Saalwachter, Microstructure and molecular dynamics of elastomers as studied by advanced low-resolution nuclear magnetic resonance methods, Rubber Chemistry and Technology, Vol. 85, No. 3, pp. 350-386 (2012).

DETAILED DESCRIPTION OF THE INVENTION

Technical Problem

The present disclosure is to provide a reinforcing material for rubber capable of imparting excellent reinforcing effect and processability to tires.

In addition, the present disclosure is to provide a rubber composition for tires including the reinforcing material for rubber.

Technical Solution

According to the present disclosure, a reinforcing material for rubber including amorphous aluminosilicate particles having a composition of the following Chemical Formula 1, wherein the aluminosilicate particles satisfy the following conditions, is provided:

in a data plot obtained by X-ray diffraction (XRD), a full width at half maximum (FWHM) in a 2θ range of 20° to 37° is 3° to 8.5°, and a maximum peak intensity ($I_{max}$) is in a 2θ range of 26° to 31°, an average primary particle diameter is 10 to 100 nm, a Brunauer-Emmett-Teller surface area ($S_{BET}$) is 80 to 250 m²/g, an external specific surface area ($S_{EXT}$) is 60 to 200 m²/g according to an analysis of nitrogen adsorption/desorption, and a volume of micropores ($V_{micro}$) having a pore size of less than 2 nm calculated from the $S_{BET}$ by a t-plot method is less than 0.05 cm³/g.

$$M_aN_b[(AlO_2)_x,(SiO_2)_y]\cdot m(H_2O) \quad \text{[Chemical Formula 1]}$$

In Chemical Formula 1,

M is an element selected from the group consisting of Li, Na, K, Rb, Cs, Be, and Fr, or an ion thereof;

N is a $NH_4^+$ ion;

0<a<1, 0<b<1, x>0, y>0, and m≥0; and 1.0≤y/x≤5.0.

In addition, according to the present disclosure, a rubber composition for tires including the reinforcing material for rubber is provided.

Hereinafter, the reinforcing material for rubber and the rubber composition for tires including the same according to the exemplary embodiments of the present disclosure will be described in more detail.

In this specification, the terms are used merely to refer to specific embodiments, and are not intended to restrict the present disclosure unless that is explicitly expressed.

Singular expressions of the present disclosure may include plural expressions unless that is differently expressed contextually.

The terms "include", "comprise", and the like of the present disclosure are used to specify certain features, regions, integers, steps, operations, elements, and/or components, and these do not exclude the existence or the addition of other certain features, regions, integers, steps, operations, elements, and/or components.

I. The Reinforcing Material for Rubber

According to an embodiment of the present disclosure, a reinforcing material for rubber including amorphous aluminosilicate particles having a composition of the following Chemical Formula 1, wherein the aluminosilicate particles satisfy the following conditions, is provided.

In a data plot obtained by X-ray diffraction (XRD), a full width at half maximum (FWHM) in a 2θ range of 20° to 37° is 3° to 8.5°, and a maximum peak intensity ($I_{max}$) is in a 2θ range of 26° to 31°, an average primary particle diameter is 10 to 100 nm, a Brunauer-Emmett-Teller surface area ($S_{BET}$) is 80 to 250 m²/g, an external specific surface area ($S_{EXT}$) is 60 to 200 m²/g according to an analysis of nitrogen adsorption/desorption, and a volume of micropores ($V_{micro}$) having a pore size of less than 2 nm calculated from the $S_{BET}$ by a t-plot method is less than 0.05 cm³/g.

$$M_aN_b[(AlO_2)_x(SiO_2)_y]\cdot m(H_2O) \quad \text{[Chemical Formula 1]}$$

In Chemical Formula 1,

M is an element selected from the group consisting of Li, Na, K, Rb, Cs, Be, and Fr, or an ion thereof;

N is a $NH_4^+$ ion;

0<a<1, 0<b<1, x>0, y>0, and m≥0; and 1.0≤y/x≤5.0.

As a result of studies by the present inventors, it was confirmed that the aluminosilicate particles satisfying the above-mentioned characteristics can exhibit improved bonding force with the rubber and dispersibility in the rubber composition since they have a composition in which a part of the alkali metal is substituted with an ammonium ion.

These aluminosilicate particles can exhibit an enhanced reinforcing effect due to excellent dispersibility in the rubber composition, but do not hinder processability of the rubber composition. Therefore, they can be very preferably applied as a reinforcing material for rubber used in a rubber composition for tires.

In addition, the aluminosilicate particles may exhibit excellent mechanical properties (for example, excellent durability, abrasion resistance, compressive strength, etc.) as compared with reinforcing materials not satisfying the above-mentioned characteristics, since the formation of micropores in the particles is reduced.

Conventional aluminosilicates do not easily disperse in the rubber composition even when a coupling agent for improving the dispersibility is used, because the aggregation of the particles strongly occurs during the dispersion in the rubber composition. However, the aluminosilicate particles satisfying the above-mentioned characteristics can achieve excellent dispersibility similar to that of silica, while improving the reinforcing effect and reducing the rolling resistance.

According to the present disclosure, the aluminosilicate particles contained in the reinforcing material for rubber are amorphous.

In particular, the amorphous aluminosilicate particles according to the embodiment of the present disclosure are characterized in that a full width at half maximum (FWHM) in a 2θ range of 20° to 37° in a data plot obtained by X-ray diffraction (XRD) satisfies 3° to 8.5°, which can exhibit excellent physical properties as a reinforcing material.

Preferably, the FWHM is 3° or more, 3.5° or more, 4.0° or more, 4.5° or more, 5.0° or more, 5.5° or more, or 6.0° or more. In addition, preferably, the FWHM is 8.5° or less, 8.0° or less, 7.5° or less, or 7.0° or less.

The full width at half maximum (FWHM) is a numerical value of a peak width at half of the maximum peak intensity in the 2θ range of 20° to 37° obtained by X-ray diffraction of the aluminosilicate particles.

The unit of the full width at half maximum (FWHM) can be expressed in degrees (°) which is the unit of 2θ. Compounds having high crystallinity may have a small FWHM value.

In addition, the amorphous aluminosilicate particles according to the embodiment of the present disclosure are characterized in that a maximum peak intensity ($I_{max}$) is in a 2θ range of 26° to 31° in a data plot obtained by X-ray diffraction (XRD).

Preferably, the maximum peak intensity ($I_{max}$) is in a 2θ range of 26° or more, 27° or more, or 28° or more. In addition, preferably, the maximum peak intensity ($I_{max}$) is in a 2θ range of 31° or less, 30.5° or less, or 30° or less.

For reference, amorphous silica shows $I_{max}$ in a 2θ range of 20° to 25° and amorphous alumina shows $I_{max}$ in a 2θ range of 30° to 40°.

In particular, the aluminosilicate particles have a composition of the following Chemical Formula 1.

$$M_aN_b[(AlO_2)_x(SiO_2)_y]\cdot m(H_2O) \quad \text{[Chemical Formula 1]}$$

In Chemical Formula 1,

M is an element selected from the group consisting of Li, Na, K, Rb, Cs, Be, and Fr, or an ion thereof;

N is a $NH_4^+$ ion;

0<a<1, 0<b<1, x>0, y>0, and m≥0; and 1.0≤y/x≤5.0.

That is, the aluminosilicate particles contain a metal element (M) or an ion thereof, an alkali metal or an ion thereof, and have a composition in which a part of M is substituted with an ammonium ion.

Since the aluminosilicate particles have a composition in which a part of the alkali metal is substituted with an ammonium ion, they can exhibit improved bonding force with rubber and excellent dispersibility in the rubber composition as compared with the aluminosilicate particles not satisfying the above-mentioned characteristics.

In the aluminosilicate particles, the proportion of the substituted ammonium ion is preferably 20 to 90 mol % of the alkali metal to be advantageous for manifesting the above-mentioned effect. Specifically, the proportion of the substituted ammonium ion may be 20 mol % or more, 25 mol % or more, or 30 mol % or more, and 90 mol % or less, 85 mol % or less, or 80 mol % or less, of the alkali metal.

If the substitution ratio of the ammonium ion is too high, problems (ammonia gas generation, etc.) may occur due to side reactions during the formation of the aluminosilicate. Therefore, the proportion of the substituted ammonium ions is preferably 90 mol % or less of the alkali metal.

The aluminosilicate particles satisfy a composition of 1.0≤y/x≤5.0 in Chemical Formula 1. Specifically, in Chemical Formula 1, y/x is 1.0 or more, 1.15 or more, 1.3 or more, 1.45 or more, 1.6 or more, 1.65 or more, 1.75 or more, 1.9 or more, or 2.0 or more, and 5.0 or less, 4.5 or less, 4.0 or less, 3.5 or less, 3.0 or less, or 2.5 or less, which may be advantageous for manifesting all of the properties according to the present disclosure.

An average primary particle diameter of all aluminosilicate particles is 10 to 100 nm, which may be advantageous for manifesting all the properties according to the present disclosure.

Specifically, the average primary particle diameter of all aluminosilicate particles is 10 nm or more, 15 nm or more, or 20 nm or more; and 100 nm or less, 80 nm or less, 60 nm or less, 50 nm or less, or 40 nm or less.

In general, the smaller the particle diameter of the reinforcing material for rubber, the better the reinforcing effect. However, the smaller the particle diameter, the more easily the aggregation phenomenon occurs between the particles in the rubber composition. If such agglomeration becomes severe, phase separation may occur between the reinforcing material for rubber and the rubber components, resulting in a decrease in processability of tires and a difficulty in achieving the desired reinforcing effect.

The aluminosilicate particles may be in the form of primary particles that are substantially non-aggregated in the rubber composition, while being amorphous particles having the above-mentioned composition.

According to the embodiment of the present disclosure, the aluminosilicate particles are characterized in that a Brunauer-Emmett-Teller surface area ($S_{BET}$) is 80 to 250 m$^2$/g, and an external specific surface area ($S_{EXT}$) is 60 to 200 m$^2$/g according to an analysis of nitrogen adsorption/desorption, which may be advantageous for manifesting all the properties according to the present disclosure.

Specifically, the $S_{BET}$ is 80 m$^2$/g or more, 85 m$^2$/g or more, 90 m$^2$/g or more, 95 m$^2$/g or more, or 100 m$^2$/g or more; and 250 m$^2$/g or less, 190 m$^2$/g or less, 180 m$^2$/g or less, 170 m$^2$/g or less, 160 m$^2$/g or less, 150 m$^2$/g or less, or 130 m$^2$/g or less.

Specifically, the $S_{EXT}$ is 60 m$^2$/g or more, 70 m$^2$/g or more, 80 m$^2$/g or more, or 90 m$^2$/g or more; and 200 m$^2$/g or less, 180 m$^2$/g or less, 160 m$^2$/g or less, 140 m$^2$/g or less, or 120 m$^2$/g or less.

Further, the ratio of $S_{BET}$ to $S_{EXT}$ ($S_{EXT}/S_{BET}$) of the aluminosilicate particles is 0.8 to 1.0, which may be advantageous for manifesting all the properties according to the present disclosure. Specifically, the $S_{EXT}/S_{BET}$ is 0.80 or more, 0.81 or more, 0.82 or more, 0.83 or more, or 0.84 or more; and 1.0 or less, 0.99 or less, 0.95 or less, or 0.90 or less.

On the other hand, it is preferable that the content of micropores in the inorganic material used as the reinforcing material for rubber is minimized. This is because the micropores act as defects and can deteriorate the physical properties of the reinforcing material for rubber.

According to an embodiment of the present disclosure, the aluminosilicate particles are characterized in that a volume of micropores ($V_{micro}$) having a pore size of less than 2 nm calculated from the $S_{BET}$ by a t-plot method is less than 0.05 cm$^3$/g, which can exhibit excellent mechanical properties as a reinforcing material for rubber. Specifically, the $V_{micro}$ is 0.05 cm$^3$/g or less, 0.025 cm$^3$/g or less, 0.02 cm$^3$/g or less, 0.015 cm$^3$/g or less, 0.01 cm$^3$/g or less, 0.007 cm$^3$/g or less, or 0.005 cm$^3$/g or less.

As described above, the reinforcing material for rubber according to the present disclosure includes amorphous aluminosilicate particles having an average primary particle diameter of 100 nm or less. Particularly, the aluminosilicate particles can exhibit excellent dispersibility in the rubber composition since they have a composition in which a part of the alkali metal is substituted with an ammonium ion, and satisfy the above-mentioned specific surface area characteristics. In addition, the aluminosilicate particles may exhibit excellent mechanical properties (for example, excellent durability, abrasion resistance, compressive strength, etc.) as compared with reinforcing materials not satisfying the above-mentioned characteristics, since the formation of micropores in the particles is reduced.

Furthermore, the aluminosilicate particles do not inhibit the progress of the vulcanization process and the curing process of the rubber composition, thereby making it possible to achieve processability of the rubber composition and productivity of the tire manufacturing process using the same.

For example, the aluminosilicate particles satisfying all of the above characteristics may be prepared by a method including the steps of:

[i] adding silicon sources, aluminum sources, ammonium ion sources, and water to a basic or alkaline solution (for example, a sodium hydroxide solution) and stirring to form an Al—O—Si structure of a monomer unit satisfying a specific metal atomic ratio;

[ii] curing the aluminosilicate monomer at a low temperature (for example, from room temperature to 90° C.) and atmospheric pressure for 3 to 24 hours to cause an Al—O—Si polymerization reaction;

[iii] washing and drying the polymerized aluminosilicate particles; and

[iv] crushing the dried aluminosilicate particles to control particle size distribution.

The aluminosilicate particles satisfying all of the above characteristics can be obtained by controlling the type of reactants, the molar ratio of reactants, and the reaction conditions to be applied to the formation of the monomer unit in the method.

In the method, fumed silica, rice husk, colloidal silica, cellite, pearlite, rice husk ash, silica fume, organosilane, clay, minerals, meta kaolin, calcined clay, active clay, fly ash, slag, pozzolan, incinerated utility waste, industrial byproducts, glass powder, red mud, or the like may be used as the silicon sources.

In addition, alumina, aluminate, aluminum salt, organic aluminoxane, pearlite, clay, minerals, meta kaolin, calcined clay, active clay, fly ash, slag, pozzolan, incinerated utility waste, industrial byproducts, glass powder, red mud, or the like may be used as the aluminum sources.

II. The Rubber Composition for Tires

According to another embodiment of the present disclosure, a rubber composition for tires including the reinforcing material for rubber is provided.

The reinforcing material for rubber includes the above-described aluminosilicate particles.

The aluminosilicate particles satisfying the above-mentioned characteristics can exhibit an enhanced reinforcing effect due to excellent dispersibility in the rubber composition, but do not hinder processability of the rubber composition. Therefore, the aluminosilicate particles can be suitably applied as a reinforcing material for rubber used in a rubber composition for tires.

In addition, the aluminosilicate particles may exhibit excellent mechanical properties (for example, excellent durability, abrasion resistance, compressive strength, etc.) as compared with reinforcing materials not satisfying the above-mentioned characteristics, since the formation of micropores in the particles is reduced.

The rubber composition for tires may include a general diene elastomer without any particular limitation.

For example, the diene elastomer may be at least one compound selected from the group consisting of a natural rubber, polybutadiene, polyisoprene, a butadiene/styrene copolymer, a butadiene/isoprene copolymer, a butadiene/acrylonitrile copolymer, an isoprene/styrene copolymer, and a butadiene/styrene/isoprene copolymer.

The rubber composition for tires may also include a coupling agent which provides chemical and/or physical bonding between the reinforcing material for rubber and the diene elastomer. As the coupling agent, conventional components such as a polysiloxane-based compound may be included without particular limitation.

In addition, plasticizers, pigments, antioxidants, ozone deterioration inhibitors, vulcanization accelerators and the like which are commonly used in the tire industry may be added to the rubber composition for tires.

Advantageous Effects

The aluminosilicate particles included in the reinforcing material for rubber according to the present disclosure can exhibit an enhanced reinforcing effect due to excellent dispersibility in the rubber composition, but do not hinder processability of the rubber composition. Therefore, the aluminosilicate particles can be suitably applied as a reinforcing material for rubber used in a rubber composition for tires.

BRIEF DESCRIPTION OF THE DRAWINGS

FIG. 1 is a SEM image of the aluminosilicate particles according to Example 1, Example 2, and Reference Example 1.

FIG. 2 is a graph showing the results of X-ray diffraction analysis of the aluminosilicate particles according to Example 1, Example 2, and Reference Example 1.

FIG. 3 is an infrared spectroscopy spectrum of the aluminosilicate particles according to Example 1, Example 2, and Reference Example 1.

FIG. 4 is a graph showing the results of specific surface area analysis of the aluminosilicate particles according to Example 1, Example 2, and Reference Example 1.

DETAILED DESCRIPTION OF THE EMBODIMENTS

Hereinafter, preferred examples are provided for better understanding. However, these examples are for illustrative purposes only, and the invention is not intended to be limited by these examples.

Example 1

22 g of KOH (Daejung Chemicals & Metals) and 27 g of colloidal silica (Ludox HS 30 wt %, Sigma-Aldrich) were completely dissolved in 21 ml of distilled water (DW). 15 g of metakaolin ($Al_2Si_2O_7$, Aldrich) was added to the solution, followed by mixing at 800 rpm for 40 minutes using an overhead stirrer.

This was cured at room temperature of about 25° C. for 24 hours.

The cured product was poured into distilled water at 90° C., stirred for 12 hours, and centrifuged to wash it to about pH 7.

The washed cured product was dried in an oven at 70° C. to obtain amorphous aluminosilicate particles.

1 g of the aluminosilicate was added to a 0.1 M $NH_4Cl$ aqueous solution, stirred for 24 hours, washed twice by centrifugation, and then dried in an oven at 70° C. to obtain ammonium ion-substituted aluminosilicate particles (a=0.7, b=0.3 in Chemical Formula 1).

SEM shape analysis and EDS composition analysis confirmed that the aluminosilicate particles were particles of about 20 nm having a composition of y/x=2.19, a/x=0.45 in Chemical Formula 1.

As a result of XRD analysis, the aluminosilicate particles had FWHM of 6.530° and $2\theta@I_{max}$ of 29.2° in the 2θ range of 20° to 37°.

As a result of specific surface area analysis, it was confirmed that the aluminosilicate particles had $S_{BET}$ of 111 $m^2/g$, $S_{EXT}$ of 99 $m^2/g$, $S_{EXT}/S_{BET}$ of 0.89, and $V_{micro}$ of 0.004 $cm^3/g$.

In addition, as a result of FT-IR spectroscopy analysis, the spectrum of the N—H bond was observed in the aluminosilicate particles, and the other spectra were observed in the same manner as in Reference Example 1. As a result, it was confirmed that the aluminosilicate of Example 1 was substituted with an N—H bond without any structural change as compared with Reference Example 1.

Example 2

22 g of KOH (Daejung Chemicals & Metals) and 27 g of colloidal silica (Ludox HS 30 wt %, Sigma-Aldrich) were completely dissolved in 21 ml of distilled water (DW). 15 g of metakaolin ($Al_2Si_2O_7$, Aldrich) was added to the solution, followed by mixing at 800 rpm for 40 minutes using an overhead stirrer.

This was cured at room temperature of about 25° C. for 24 hours.

The cured product was poured into distilled water at 90° C., stirred for 12 hours, and centrifuged to wash it to about pH 7.

The washed cured product was dried in an oven at 70° C. to obtain amorphous aluminosilicate particles.

1 g of the aluminosilicate was added to a 1.0 M $NH_4Cl$ aqueous solution, stirred for 24 hours, washed twice by centrifugation, and then dried in an oven at 70° C. to obtain ammonium ion-substituted aluminosilicate particles (a=0.2, b=0.8 in Chemical Formula 1).

SEM shape analysis and EDS composition analysis confirmed that the aluminosilicate particles were particles of about 20 nm having a composition of y/x=2.08, a/x=0.47 in Chemical Formula 1.

As a result of XRD analysis, the aluminosilicate particles had FWHM of 6.457° and $2\theta@I_{max}$ of 29.2° in the 2θ range of 20° to 37°.

As a result of specific surface area analysis, it was confirmed that the aluminosilicate particles had $S_{BET}$ of 112 $m^2/g$, $S_{EXT}$ of 101 $m^2/g$, $S_{EXT}/S_{BET}$ Of 0.90, and $V_{micro}$ of 0.004 $cm^3/g$.

In addition, as a result of FT-IR Spectroscopy analysis, it was confirmed that the aluminosilicate particles exhibited the same intensity variation as in Example 1. Considering this characteristic, it is expected that the concentration of ammonium ions applied to the preparation of aluminosilicate particles does not greatly affect the substitution, but rather the amount of ammonium ions that can be substituted is limited depending on material characteristics.

Reference Example 1

22 g of KOH (Daejung Chemicals & Metals) and 27 g of colloidal silica (Ludox HS 30 wt %, Sigma-Aldrich) were completely dissolved in 21 ml of distilled water (DW). 15 g of metakaolin ($Al_2Si_2O_7$, Aldrich) was added to the solution, followed by mixing at 800 rpm for 40 minutes using an overhead stirrer.

This was cured at room temperature of about 25° C. for 24 hours.

The cured product was poured into distilled water at 90° C., stirred for 12 hours, and centrifuged to wash it to about pH 7.

The washed cured product was dried in an oven at 70° C. to obtain amorphous aluminosilicate particles (a=1.0, b=0 in Chemical Formula 1).

SEM shape analysis and EDS composition analysis confirmed that the aluminosilicate particles were particles of about 20 nm having a composition of y/x=1.61, a/x=0.83 in Chemical Formula 1.

As a result of XRD analysis, the aluminosilicate particles had FWHM of 6.496° and $2\theta@I_{max}$ of 28.5° in the 2θ range of 20° to 37°.

As a result of specific surface area analysis, it was confirmed that the aluminosilicate particles had $S_{BET}$ of 126 m²/g, $S_{EXT}$ of 108 m²/g, $S_{EXT}/S_{BET}$ of 0.86, and $V_{micro}$ of 0.007 cm³/g.

Reference Example 2

Silica (product name: 7000GR) manufactured by Evonic was prepared.

The silica had $2\theta@I_{max}$ of 22.2°. It was subjected to specific surface area analysis, and the results were $S_{BET}$=175 m²/g, $S_{EXT}$=144 m²/g, $S_{EXT}/S_{BET}$=0.82, and $V_{micro}$=0.012 cm³/g.

Reference Example 3

An aluminosilicate (product name: Zeolex 23A) manufactured by Huber Engineered Materials was prepared.

The aluminosilicate had an amorphous structure in general, but some crystalline structures were mixed and exhibited an XRD pattern (FWHM=8.538°, $2\theta@I_{max}$=23.7° in the 2θ range of 20° to 37° of XRD) that was different from the particles according to Examples 1 and 2. Further, it was confirmed that the aluminosilicate had a composition of M=Na, y/x=8.63, and x/n=1.05 in Chemical Formula 1.

The aluminosilicate of about 20 nm was subjected to specific surface area analysis, and the results were $S_{BET}$=82.49 m²/g, $S_{EXT}$=74.59 m²/g, $S_{EXT}/S_{BET}$=0.90, and $V_{micro}$=0.003 cm³/g.

Reference Example 4

An aluminosilicate (product name: Zeolex 23A) manufactured by Huber Engineered Materials was prepared.

1 g of the aluminosilicate was added to a 0.1 M $NH_4Cl$ aqueous solution, stirred for 24 hours, washed twice by centrifugation, and then dried in an oven at 70° C. to obtain ammonium ion-substituted aluminosilicate particles (a=0.7, b=0.3 in Chemical Formula 1).

The aluminosilicate had an amorphous structure in general, but some crystalline structures were mixed and exhibited an XRD pattern (FWHM=7.717°, $2\theta@I_{max}$=23.7° in the 2θ range of 20° to 37° of XRD) that was different from the particles according to Examples 1 and 2. Further, it was confirmed that the aluminosilicate had a composition of M=Na, y/x=8.56, a/x=0.18 in Chemical Formula 1.

The aluminosilicate of about 20 nm was subjected to specific surface area analysis, and the results were $S_{BET}$=87.75 m²/g, $S_{EXT}$=72.75 m²/g, $S_{EXT}/S_{BET}$=0.83, and $V_{micro}$=0.006 cm³/g.

Reference Example 5

An aluminosilicate (product name: Zeolex 23A) manufactured by Huber Engineered Materials was prepared.

1 g of the aluminosilicate was added to a 1.0 M $NH_4Cl$ aqueous solution, stirred for 24 hours, washed twice by centrifugation, and then dried in an oven at 70° C. to obtain ammonium ion-substituted aluminosilicate particles (a=0.2, b=0.8 in Chemical Formula 1).

The aluminosilicate had an amorphous structure in general, but some crystalline structures were mixed and exhibited an XRD pattern (FWHM=7.573°, $2\theta@I_{max}$=23.7° in the 2θ range of 20° to 37° of XRD) that was different from the particles according to Examples 1 and 2. Further, it was confirmed that the aluminosilicate had a composition of M=Na, y/x=8.56, and a/x=0.06 in Chemical Formula 1.

The aluminosilicate of about 20 nm was subjected to specific surface area analysis, and the results were $S_{BET}$=87.49 m²/g, $S_{EXT}$=73.18 m²/g, $S_{EXT}/S_{BET}$=0.84, and $V_{micro}$=0.006 cm³/g.

Preparation Example 1

137 g of a diene elastomer mixture (SSBR 2550, LG Chemical), 70 g of the aluminosilicate particles according to Example 1 as a reinforcing material, and 11.2 g of a silane coupling agent (polysiloxane-based) were added to a closed mixer. This was mixed at 150° C. for 5 minutes, and then mixed with sulfur and a vulcanization accelerator for 90 seconds.

The resulting mixture was extruded in the form of a sheet having a thickness of 2 to 3 mm, and vulcanized at 160° C. to obtain a rubber molded product. At this time, the vulcanization time was controlled referring to data obtained by measuring the above mixture at 160° C. using a moving die rheometer (MDR).

A bound rubber value of the rubber composition prepared according to Preparation Example 1 was measured as 162. The bound rubber value is a normalized value when the bound rubber value of the rubber including silica is taken as 100.

Preparation Example 2

A rubber composition and a molded product were obtained in the same manner as in Preparation Example 1, except that the aluminosilicate particles according to Example 2 were added as a reinforcing material.

Preparation Example 3

A rubber composition and a molded product were obtained in the same manner as in Preparation Example 1, except that the aluminosilicate particles according to Reference Example 1 were added as a reinforcing material.

The bound rubber value of the rubber composition prepared according to Preparation Example 3 was measured as 103.

Preparation Example 4

A rubber composition and a molded product were obtained in the same manner as in Preparation Example 1, except that the silica particles according to Reference Example 2 were added as a reinforcing material.

Preparation Example 5

A rubber composition was obtained in the same manner as in Preparation Example 1, except that the aluminosilicate particles according to Reference Example 3 were added as a reinforcing material.

However, the rubber composition according to Preparation Example 5 was unable to produce a molded product, because the rubber was decomposed at the time of compounding.

Preparation Example 6

A rubber composition was obtained in the same manner as in Preparation Example 1, except that the aluminosilicate particles according to Reference Example 4 were added as a reinforcing material.

However, the rubber composition according to Preparation Example 6 was unable to produce a molded product, because the rubber was decomposed at the time of compounding.

Preparation Example 7

A rubber composition was obtained in the same manner as in Preparation Example 1, except that the aluminosilicate particles according to Reference Example 5 were added as a reinforcing material.

However, the rubber composition according to Preparation Example 7 was unable to produce a molded product, because the rubber was decomposed at the time of compounding.

Experimental Example 1

The average primary particle diameter and composition of the particles according to the examples and reference examples were confirmed using scanning electron microscopy (SEM) and energy dispersive X-ray spectroscopy (EDS). The photographed SEM images are sequentially shown in FIG. 1 (a) [Example 1], FIG. 1 (b) [Example 2], and FIG. 1 (c) [Reference Example 1].

In the measurement of the average primary particle diameter, the particle diameter means a Feret diameter, and was calculated as an average of the values obtained by measuring the particle diameters in various directions. Specifically, after obtaining a SEM image in which more than 100 particles were observed, a random straight line was plotted, and the primary particle diameter of the particle was calculated using the length of the straight line, the number of particles included in the straight line, and the magnification. The average primary particle diameter was determined by setting 20 or more of these straight lines.

The EDS was operated under conditions of 15 kV and a working distance of 15 mm.

TABLE 1

| | Composition (Chemical Formula 1) | | | |
|---|---|---|---|---|
| | a | b | y/x | a/x |
| Example 1 | 0.7 | 0.3 | 2.19 | 0.45 |
| Example 2 | 0.2 | 0.8 | 2.08 | 0.47 |
| Ref. Example 1 | 1.0 | 0 | 1.61 | 0.83 |
| Ref. Example 3 | 1.0 | 0 | 8.63 | 1.05 |
| Ref. Example 4 | 0.7 | 0.3 | 8.56 | 0.18 |
| Ref. Example 5 | 0.2 | 0.8 | 8.56 | 0.06 |

Experimental Example 2

The nitrogen adsorption/desorption Brunauer-Emmett-Teller surface area ($S_{BET}$) and the external specific surface area ($S_{EXT}$) were measured for each of the particles according to the examples and reference examples using a specific surface area analyzer (BEL Japan Inc., BELSORP_MAX). Then, the volume of micropores ($V_{micro}$) having a pore size of less than 2 nm was calculated from the $S_{BET}$ by a t-plot method.

The specific surface area analysis can be performed by measuring the amount of gas adsorption while increasing the gas partial pressure to a saturated vapor pressure ($P_0$) and measuring the amount of gas desorption while reducing the partial pressure after the saturated vapor pressure state ($P/P_0=1$) to obtain isotherm ads/des graph like FIG. 4. Using this, $S_{BET}$ can be obtained by a BET plot, and $S_{EXT}$ and $V_{micro}$ can be calculated by a t-plot.

TABLE 2

| | Diameter (nm) | $S_{BET}$ (m²/g) | $S_{EXT}$ (m²/g) | $S_{EXT}/S_{BET}$ | $V_{micro}$ (cm³/g) |
|---|---|---|---|---|---|
| Example 1 | 20 | 111 | 99 | 0.89 | 0.004 |
| Example 2 | 20 | 112 | 101 | 0.90 | 0.004 |
| Ref. Example 1 | 20 | 126 | 108 | 0.86 | 0.007 |
| Ref. Example 2 | 20 | 175 | 144 | 0.82 | 0.012 |
| Ref. Example 3 | 20 | 82.49 | 74.59 | 0.90 | 0.003 |
| Ref. Example 4 | 20 | 87.75 | 72.75 | 0.83 | 0.006 |
| Ref. Example 5 | 20 | 87.49 | 73.18 | 0.84 | 0.006 |

Experimental Example 3

X-ray diffraction analysis for each aluminosilicate particle according to Examples and Reference Examples was carried out using an X-ray diffractometer (Bruker AXS D4-Endeavor XRD) under an applied voltage of 40 kV and an applied current of 40 mA.

The measured range of 2θ was 10° to 90°, and it was scanned at an interval of 0.05°. Herein, a variable divergence slit of 6 mm was used as a slit, and a large PMMA holder (diameter=20 mm) was used to eliminate background noise due to the PMMA holder.

The data plots of Example 1 and Reference Example 1 obtained by X-ray diffraction are shown in FIG. 1

And, a full width at half maximum (FWHM) at a peak of about 29° which is the maximum peak in the 2θ range of 20° to 37° was calculated in the data plot obtained by X-ray diffraction (XRD).

TABLE 3

| | FWHM (°) | $I_{max}$ (°) | Crystal form |
|---|---|---|---|
| Example 1 | 6.530 | 29.2 | Amorphous |
| Example 2 | 6.457 | 29.2 | Amorphous |
| Ref. Example 1 | 6.496 | 28.5 | Amorphous |
| Ref. Example 3 | 8.538 | 23.7 | Amorphous |
| Ref. Example 4 | 7.717 | 23.7 | Amorphous |
| Ref. Example 5 | 7.573 | 23.7 | Amorphous |

Experimental Example 4

The absorbance within a wavenumber of 600 to 4000 cm$^{-1}$ was measured under an ATR (attenuated total reflectance) IR mode condition using an infrared spectroscopy (FTS 3000) to analyze the aluminosilicate particles according to Examples 1~2 and Reference Example 1. The results are shown in FIG. 3.

Experimental Example 5

A Time-Domain NMR (Minispec) was used to obtain signal decay over time by setting the application mode to sc-Ic-co at a temperature of 40° C. The bound rubber value can be calculated through double exponential fitting from the measured graph. The bound rubber value of the rubber composition prepared according to the above preparation examples was a normalized value when the calculated silica bound rubber value of the silica-kneaded rubber composition was taken as 100.

The bound rubber is a component formed on the surface of the filler in the unvulcanized rubber composition in which the filler is kneaded, and it is possible to indirectly confirm the reinforcing effect due to the addition of the filler depending on how well it is developed. For example, it is known that as the bound rubber increases, tan(delta) (@60° C.) is low and the rolling resistance of the rubber decreases.

TABLE 4

|  | Prep. Ex. 1 | Prep. Ex. 2 | Prep. Ex. 3 | Prep. Ex. 4 |
|---|---|---|---|---|
| Reinforcing material | Example 1 | Example 2 | Ref. Ex. 1 | Ref. Ex. 2 |
| Bound rubber | 162 | 165 | 103 | 100 |

Referring to Table 4, it was confirmed that the rubber compositions of Preparation Examples 1 and 2, to which the aluminosilicates of the examples were applied, exhibited higher bound rubber values than the case in which the aluminosilicate of Reference Example 1 or the silica of Reference Example 2 was applied, indicating excellent reinforcing effects.

The invention claimed is:

1. A reinforcing material for rubber comprising amorphous aluminosilicate particles having a composition of the following Chemical Formula 1,
   wherein the aluminosilicate particles satisfy the following conditions:
   in a data plot obtained by X-ray diffraction (XRD), a full width at half maximum (FWHM) in a 2θ range of 20° to 37° is 3° to 8.5°, and a maximum peak intensity ($I_{max}$) is in a 2θ range of 26° to 31°,
   an average primary particle diameter is 10 to 100 nm,
   a Brunauer-Emmett-Teller surface area ($S_{BET}$) is 80 to 250 m²/g, an external specific surface area ($S_{EXT}$) is 60 to 200 m²/g according to an analysis of nitrogen adsorption/desorption, and
   a volume of micropores ($V_{micro}$) having a pore size of less than 2 nm calculated from the $S_{BET}$ by a t-plot method is less than 0.05 cm³/g, $$M_aN_b[(AlO_2)_x,(SiO_2)_y]\cdot m(H_2O) \quad \text{[Chemical Formula 1]}$$

In Chemical Formula 1,
   M is an element selected from the group consisting of Li, Na, K, Rb, Cs, Be, and Fr, or an ion thereof;
   N is a $NH_4^+$ ion;
   $0<a<1$, $0<b<1$, $x>0$, $y>0$, and $m≥0$; and
   $1.0≤y/x≤5.0$.

2. The reinforcing material for rubber of claim 1, wherein the aluminosilicate particles satisfy $0.8≤S_{EXT}/S_{BET}≤1.0$.

3. A rubber composition for tires comprising the reinforcing material for rubber of claim 1.

4. The rubber composition for tires of claim 3, wherein the composition comprises the reinforcing material for rubber and at least one diene elastomer.

5. The rubber composition for tires of claim 4, wherein the diene elastomer is at least one compound selected from the group consisting of a natural rubber, polybutadiene, polyisoprene, a butadiene/styrene copolymer, a butadiene/isoprene copolymer, a butadiene/acrylonitrile copolymer, an isoprene/styrene copolymer, and a butadiene/styrene/isoprene copolymer.

* * * * *